(12) United States Patent
Murayama et al.

(10) Patent No.: US 11,194,406 B2
(45) Date of Patent: Dec. 7, 2021

(54) NON-CONTACT INPUT DEVICE

(71) Applicant: FUNAI ELECTRIC CO., LTD., Osaka (JP)

(72) Inventors: Manabu Murayama, Osaka (JP); Tatsuya Ito, Osaka (JP); Fuminori Tanaka, Osaka (JP); Kazuya Sudo, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 16/822,000

(22) Filed: Mar. 17, 2020

(65) Prior Publication Data

US 2020/0319720 A1   Oct. 8, 2020

(30) Foreign Application Priority Data

Apr. 2, 2019 (JP) .............................. JP2019-070653

(51) Int. Cl.
  *G06F 3/03* (2006.01)
  *G01J 1/04* (2006.01)
  *G06F 3/0481* (2013.01)

(52) U.S. Cl.
  CPC .......... *G06F 3/0325* (2013.01); *G01J 1/0403* (2013.01); *G06F 3/04817* (2013.01)

(58) Field of Classification Search
  CPC .... G01J 1/0403; G06F 3/0325; G06F 3/0423; G06F 3/04817; G06F 2203/04108
  See application file for complete search history.

(56) References Cited

U.S. PATENT DOCUMENTS

| | | | |
|---|---|---|---|
| 8,305,669 B2 | 11/2012 | Akedo et al. | |
| 9,919,191 B2 | 3/2018 | Inoue et al. | |
| 2009/0058832 A1 | 3/2009 | Newton | |
| 2010/0014140 A1* | 1/2010 | Akedo | G02B 26/0833 359/199.1 |
| 2010/0321344 A1* | 12/2010 | Yen | G06F 3/0421 345/175 |
| 2016/0306500 A1 | 10/2016 | Zhu | |
| 2018/0217670 A1 | 8/2018 | Cho et al. | |

FOREIGN PATENT DOCUMENTS

| | | |
|---|---|---|
| JP | 5229704 | 7/2013 |
| JP | 6029640 | 11/2016 |
| JP | 2018088027 | 6/2018 |
| WO | 2018216619 | 11/2018 |

* cited by examiner

*Primary Examiner* — Yaron Cohen
(74) *Attorney, Agent, or Firm* — JCIPRNET

(57) ABSTRACT

An input device includes an optical sensor which senses an object on a plane where the emitted light travels, an optical member which changes a path of the light emitted from the optical sensor, and a processing unit which performs input processing based on sensing results of the optical sensor; the optical sensor and the optical member form a first sensing surface consisting of a planar region in which the light emitted from the optical sensor travels and a second sensing surface that is farther from the optical sensor than the first sensing surface, and the processing unit performs the input processing based on a first sensing result of the optical sensor on the first sensing surface and a second sensing result of the optical sensor on the second sensing surface.

16 Claims, 8 Drawing Sheets

NON-CONTACT INPUT DEVICE

CROSS REFERENCE TO RELATED APPLICATION

This application claims the priority benefit of Japanese Patent Application No. 2019-070653, filed on Apr. 2, 2019. The entirety of the above-mentioned patent application is hereby incorporated by reference herein and made a part of this specification.

BACKGROUND OF THE DISCLOSURE

Technical Field

The disclosure relates to an input device.

Related Art

Conventionally, an input device in which aerial imaging and a sensor are combined and which is capable of performing a non-contact input operation is known (for example, see patent literature 1).

LITERATURE OF RELATED ART

Patent Literature

[Patent literature 1] Japanese Patent Laid-open No. 2018-88027
[Patent literature 2] Japanese Patent No. 6029640
[Patent literature 3] Japanese Patent No. 5229704

In the conventional input device described in patent literature 1, it is difficult to precisely detect the position of an object to be detected by the sensor in a direction perpendicular to a plane on which an aerial image is displayed. Therefore, in the above conventional input device, there is a constant limit in the precision for receiving the non-contact input operation.

SUMMARY

In order to achieve the input device of one aspect of the disclosure includes an optical sensor which emits light traveling in a planar shape and senses an object on the plane where the emitted light travels, an optical member which changes a path of the light emitted from the optical sensor, and a processing unit which performs input processing based on sensing results of the optical sensor; the optical sensor and the optical member form a first sensing surface consisting of a planar region in which the light emitted from the optical sensor travels and a second sensing surface that is farther from the optical sensor than the first sensing surface, and the processing unit performs the input processing based on a first sensing result of the optical sensor on the first sensing surface and a second sensing result of the optical sensor on the second sensing surface.

DESCRIPTION OF THE EMBODIMENTS

Figure 1:
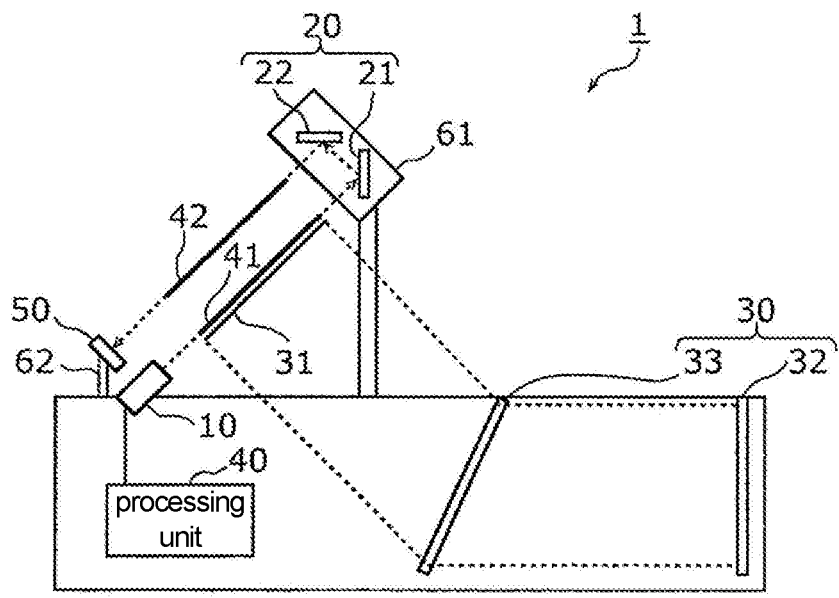
FIG. 1 is a block diagram showing a configuration of an input device of Embodiment 1.

One of the embodiments of the disclosure is to provide an input device capable of precisely receiving a non-contact input operation.

According to the input device having the above configuration, in addition to the position of the object to be sensed by the optical sensor on a plane substantially parallel to a display surface, the position in a direction perpendicular to the display surface can also be detected.

Thus, according to the input device having the above configuration, the non-contact input operation can be precisely received.

For example, the light traveling on the second sensing surface may be the light traveling on the first sensing surface whose path has been changed by the optical member.

Thereby, the first sensing surface and the second sensing surface can be formed simultaneously.

For example, the optical member may include a rotatable optical element capable of changing the path of the light emitted from the optical sensor; the first sensing surface may be formed when the rotation angle of the optical element is a first angle, and the second sensing surface may be formed when the rotation angle of the optical element is a second angle.

Thereby, the first sensing surface and the second sensing surface can be formed by controlling the rotation angle of the optical element.

For example, the optical member may include a movable optical element capable of changing the path of the light emitted from the optical sensor; the first sensing surface may be formed when the position of the optical element is a first position, and the second sensing surface may be formed when the position of the optical element is a second position.

Thereby, the first sensing surface and the second sensing surface can be formed by controlling the position of the optical element.

For example, the first sensing surface and the second sensing surface may be substantially parallel. Here, "substantially parallel" refers to not only a strictly parallel state but also an essentially parallel state.

Thereby, the position of the object to be sensed by the optical sensor in the direction perpendicular to the display surface can be more precisely detected.

For example, the optical member may include a mirror.

Thereby, an optical member can be implemented by a relatively simple configuration.

For example, a display unit which displays an image on the display surface may be further included.

Thereby, the display surface can be displayed.

For example, the display surface may be substantially parallel to at least one of the first sensing surface and the second sensing surface.

Thereby, the sensing precision of the optical sensor can be improved.

For example, the display unit may display the image on the display surface by aerial imaging, and the display surface may be formed on the first sensing surface or the second sensing surface.

Thereby, the frequency at which a user performing the input operation comes into contact with the display unit can be reduced.

For example, an incidence suppression member which suppresses the light emitted from the optical sensor from being incident on the optical sensor without contacting the object to be sensed may be further included.

Thereby, the sensing precision of the optical sensor can be improved.

For example, the display unit may include an icon in the displayed image, and the processing unit may detect, based on the first sensing result and the second sensing result, a click movement of clicking the icon from a user who uses the input device and perform the input processing based on the detection.

Thereby, the input operation performed by the movement of clicking the icon from the user can be received.

According to the disclosure, an input device capable of precisely receiving a non-contact input operation is provided.

Hereinafter, embodiments of the disclosure are described in detail with reference to the drawings. Besides, each of the embodiments described below shows a comprehensive or specific example. Numerical values, shapes, materials, components, arrangement positions and connection forms of the components, and the like shown in the following embodiments are merely examples and are not intended to limit the disclosure. In addition, components not described in the independent claims within the components in the following embodiments are described as arbitrary components.

Embodiment 1

An input device of Embodiment 1 is described below with reference to the drawings. The input device displays an image formed by aerial imaging, and receives a non-contact input operation on the displayed image from a user who uses the input device.

FIG. 1 is a block diagram showing a configuration of the input device 1 of Embodiment 1.

As shown in FIG. 1, the input device 1 includes an optical sensor 10, an optical member 20, a display unit 30, a processing unit 40, an incidence suppression member 50, a first support member 61, and a second support member 62.

The optical sensor 10 emits light traveling in a planar shape and senses an object on the plane where the emitted light travels. More specifically, the optical sensor 10 detects the position of an object on the plane where the emitted light travels. The optical sensor 10 may be implemented by an optical proximity sensor described in patent literature 2 for example, may be implemented by an optical operation device described in patent literature 3 for example, or may be implemented by other configurations. Here, as an example, the optical sensor 10 is implemented by the optical proximity sensor described in patent literature 2.

The optical member 20 changes a path of the light emitted from the optical sensor 10. More specifically, the optical member 20 includes a first optical element 21 which changes the path of light and a second optical element 22 which changes the path of light. The first optical element 21 and the second optical element 22 may be implemented by, for example, a mirror, a prism, or other configurations. Here, as an example, the first optical element 21 and the second optical element 22 are configured by mirrors.

Figure 2:
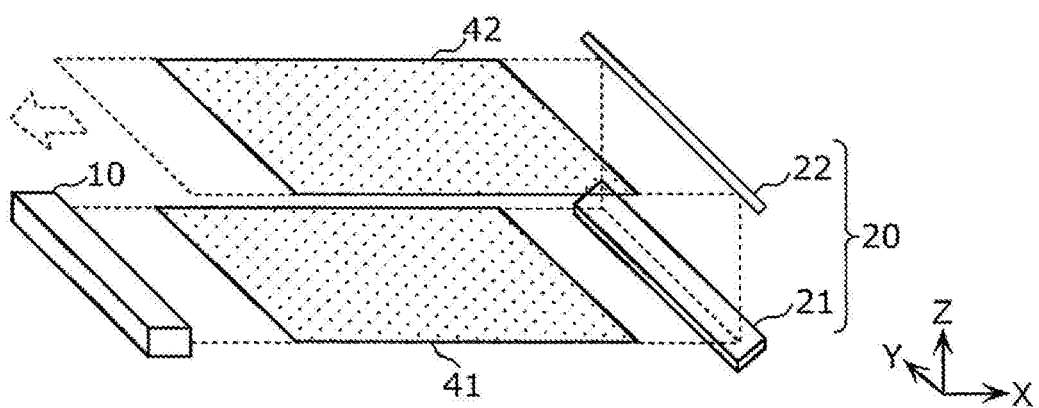
FIG. 2 is a schematic diagram showing a state in which an optical member of Embodiment 1 changes a path of light emitted from an optical sensor of Embodiment 1.

FIG. 2 is a schematic diagram showing a state in which the optical member 20 changes the path of the light emitted from the optical sensor 10.

As shown in FIG. 2, the first optical element 21 has a mirror surface that is tilted 45 degrees to the positive direction of a Z-axis from a plane defined by an X-axis direction and a Y-axis direction shown in FIG. 2.

The second optical element 22 has a mirror surface that is tilted 135 degrees to the positive direction of the Z-axis from the plane defined by the X-axis direction and the Y-axis direction shown in FIG. 2.

The optical sensor 10 emits light traveling in a planar shape in the positive direction of the X-axis on the plane defined by the X-axis direction and the Y-axis direction shown in FIG. 2.

As shown in FIG. 2, the light emitted from the optical sensor 10 is reflected by the first optical element 21, and travels in the positive direction of the Z-axis on a plane defined by the Z-axis direction and the Y-axis direction shown in FIG. 2. That is, the path of the light emitted from the optical sensor 10 and traveling in a planar shape is changed from the positive direction of the X-axis to the positive direction of the Z-axis by the first optical element 21. Then, the light whose path has been changed by the first optical element 21 is reflected by the second optical element 22, and travels in the negative direction of the X-axis on the plane defined by the X-axis direction and the Y-axis direction shown in FIG. 2. That is, the path of the light traveling in a planar shape whose path has been changed by the first optical element 21 is changed from the positive direction of the Z-axis to the negative direction of the X-axis by the second optical element 22.

As shown in FIGS. 1 and 2, the optical sensor 10 and the optical member 20 form a first sensing surface 41 and a second sensing surface 42, the first sensing surface 41 consisting of a plane on which the light emitted from the optical sensor 10 whose path has not been changed by the optical member 20 travels, the second sensing surface 42 consisting of a plane on which the light emitted from the optical sensor 10 whose path has been changed one or more times (twice in this embodiment) by the optical member 20 travels. Here, the second sensing surface 42 is located farther from the optical sensor 10 than the first sensing surface 41.

As described above, the first sensing surface 41 and the second sensing surface 42 are both planes defined by the X-axis direction and the Y-axis direction shown in FIG. 2. Therefore, the first sensing surface 41 and the second sensing surface 42 are substantially parallel to each other. In the following description, the position of the first sensing surface 41 in the Z-axis direction shown in FIG. 2 is set as z1, and the position of the second sensing surface 42 in the Z-axis direction is set as z2.

The optical sensor 10 detects the position on the first sensing surface of the object on the first sensing surface 41. That is, the optical sensor 10 detects the positions of the object to be sensed in the X-axis direction and in the Y-axis direction at positions where Z=z1.

In addition, the optical sensor 10 detects the position on the second sensing surface of the object on the second sensing surface 42. That is, the optical sensor 10 detects the positions of the object to be sensed in the X-axis direction and in the Y-axis direction at positions where Z=z2. In this case, Z=z2 is farther from the optical sensor 10 than Z=z1.

The display unit 30 displays an image on the display surface 31. More specifically, the display unit 30 includes a display 32 and an aerial imaging optical element 33, and the aerial imaging optical element 33 is used to perform aerial imaging on the image output from the display 32 to thereby display the image on the surface 31. Besides, the display unit 30 is not necessarily limited to the above configuration as long as it can display the image on the display surface 31. For example, the display unit 30 may also be implemented by a configuration in which the display unit 30 includes a display, a half mirror and a retroreflective sheet, and the half mirror and the retroreflective sheet are used to perform aerial imaging on the image output from the display by a retroreflective method to thereby display the image on the display surface 31.

The display surface 31 is substantially parallel to at least one of the first sensing surface 41 and the second sensing surface 42. Here, since the first sensing surface 41 and the second sensing surface 42 are substantially parallel to each other, the display surface 31 is substantially parallel to the first sensing surface 41 and the second sensing surface 42. The display surface 31 may be formed on the first sensing surface 41 or the second sensing surface.

The incidence suppression member 50 is disposed on the path of the light whose path has been changed by the optical member 20, and suppresses the light whose path has been changed by the optical member 20 from being directly incident on the optical sensor 10 without contacting the object to be sensed. That is, the incidence suppression member 50 suppresses the light emitted from the optical sensor 10 from being incident on the optical sensor 10 without contacting the object to be sensed. The incidence suppression member 50 may be implemented by, for example, a light absorption material that absorbs light in a frequency band of the light emitted from the optical sensor 10, a mirror that reflects light in a direction in which the light is not incident on the optical sensor 10, or other configurations.

The first support member 61 is a member that supports the optical member 20.

The second support member 62 is a member that supports the incidence suppressing member 50.

The processing unit 40 performs input processing based on the first sensing result of the optical sensor 10 on the first sensing surface 41 and the second sensing result of the optical sensor 10 on the second sensing surface 42. For example, the processing unit 40 may include a processor and a memory and perform the input processing by the processor executing a program stored in the memory.

Hereinafter, as a specific example of the input processing performed by the processing unit 40, click input processing for receiving a click operation of clicking an icon displayed on the display surface 31 from the user who uses the input device 1 is described with reference to the drawings. In the following description, it is assumed that the display surface 31 is substantially parallel to the first sensing surface 41 and the second sensing surface 42, and the position of the display surface 31 in the Z-axis direction shown in FIG. 2 is z0. However, the display surface 31 is not necessarily limited to the example in which the display surface 31 is substantially parallel to the first sensing surface 41 and the second sensing surface 42.

Figure 3A:
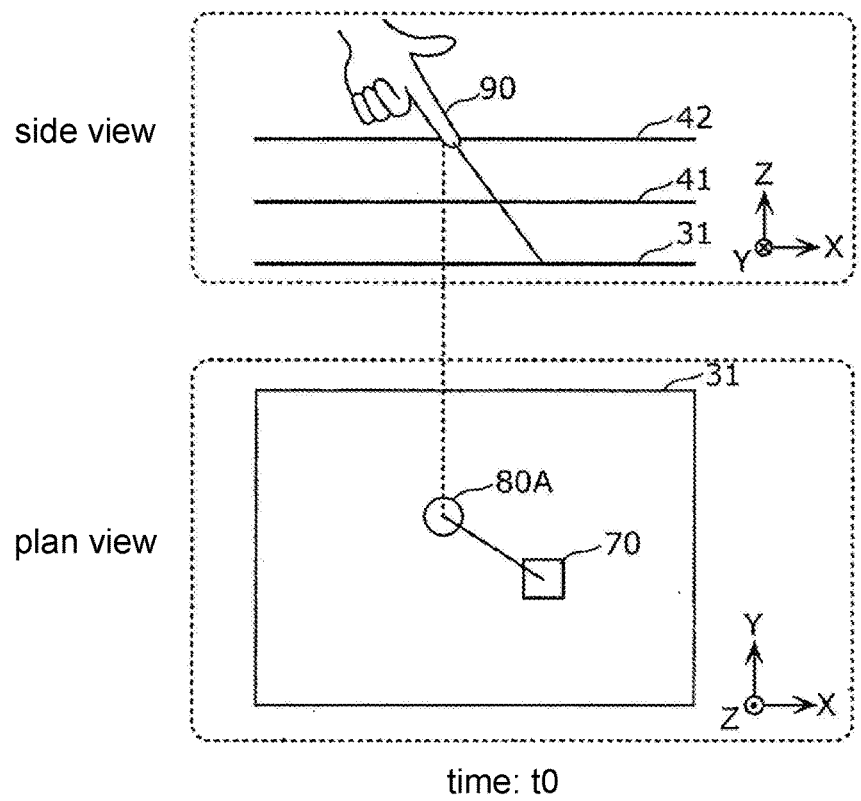
FIG. 3A is a schematic diagram showing a state in which a user uses a finger to perform a click operation.
Figure 3B:
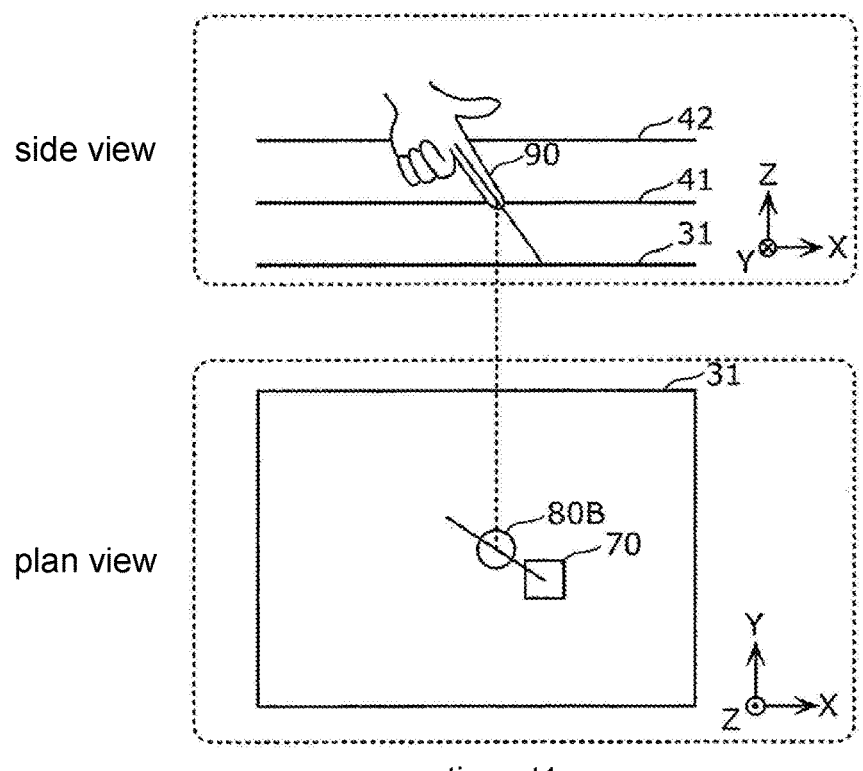
FIG. 3B is a schematic diagram showing a state in which the user uses a finger to perform the click operation.

FIG. 3A and FIG. 3B are schematic diagrams showing a state in which the user uses a finger to perform the click operation. FIG. 3A is a schematic diagram at time t0, and FIG. 3B is a schematic diagram at time t1 (t1>t0).

As shown in FIGS. 3A and 3B, the display unit 30 displays an icon 70 to be clicked on the display surface 31 during the click input processing.

When the user starts the click operation and enters the second sensing surface 42 at time t0 with a finger 90 of user so as to click the icon 70 displayed on the display surface 31, the optical sensor 10 detects an X-axis coordinate x2 and a Y-axis coordinate y2 indicating the position of the finger 90 on the second sensing surface 42. Then, the processing unit 40 acquires the x2 and y2 detected by the optical sensor 10. Then, the processing unit 40 stores the acquired x2 and y2 in association with z2 indicating the position of the second sensing surface 42 in the Z-axis direction. At this time, the processing unit 40 may display a graphic 80A indicating the finger 90 at a position on the display surface 31 corresponding to the acquired x2 and y2. In addition, at this time, when the input device 1 includes a speaker, the processing unit 40 may output a sound indicating that the finger 90 enters the second sensing surface 42. In this way, by notifying the user that the click input processing is started through vision, hearing or the like, the user can recognize that the input processing is started.

Next, when the finger 90 of the user enters the first sensing surface 41 at time t, the optical sensor 10 detects an X-axis coordinate x1 and a Y-axis coordinate y1 indicating the position of the finger 90 on the first sensing surface 41. Then, the processing unit 40 acquires the x1 and y1 detected by the optical sensor 10. Then, the processing unit 40 stores the acquired x1 and y1 in association with z1 indicating the position of the first sensing surface 41 in the Z-axis direction. At this time, the processing unit 40 may display a graphic 80B indicating the finger 90 at a position on the display surface 31 corresponding to the acquired x1 and y1. In addition, at this time, when the input device 1 includes a speaker, the processing unit 40 may output a sound indicating that the finger 90 enters the first sensing surface 41. In this way, by notifying the user that the finger 90 of the user is closer to the input device 1 through vision, hearing or the like, the user can pay attention not to touch the input device 1 with the finger 90 or the like.

Next, based on the acquired x2, y2, x1, and y1, the processing unit 40 estimates the position on the display surface 31 to which the finger 90 points. More specifically, the processing unit 40 linearly complements and extends a first vector in which the position indicated by x2, y2, and z2 on the second sensing surface 42 is used as a start point and the position indicated by x1, y1, and z1 on the first sensing surface 41 is used as an end point so that the end point position is on the display surface 31 to perform the linear interpolation and extend, thereby calculating a second vector in which the position indicated by x2, y2, and z2 on the second sensing surface 42 is used as a start point and the position indicated by x0, y0, and z0 on the display surface 31 is used as an end point. Then, the X-axis coordinate x0 and the Y-axis coordinate y0 indicating the end point position of the second vector are estimated as the position on the display surface 31 to which the finger 90 points.

When the estimated position on the display surface 31 matches the display position of the icon 70, the processing unit 40 determines that the finger 90 has clicked the icon 70. Then, the processing unit 40 receives the click operation performed by the user in which the icon 70 displayed on the display surface 31 is clicked.

Besides, in this embodiment, the click operation performed by the user using a finger is described as an example, but the click operation is not necessarily performed using a finger. The click operation may be performed using any object to be sensed by the optical sensor 10, for example, an indicator bar or a pen.

According to the input device 1 having the above configuration, in addition to the position on the plane substantially parallel to the display surface 31, the position in a direction perpendicular to the display surface 31 of the object to be sensed by the optical sensor 10 can also be detected. Thus, according to the input device 1, the non-contact input operation can be precisely received.

(Variant 1)

Hereinafter, an input device of Variant 1 in which a part of the configuration is changed from the input device 1 of Embodiment 1 is described.

The input device of Variant 1 is configured from the input device 1 by changing the optical member 20 to an optical member of Variant 1. More specifically, the optical member of Variant 1 is changed and configured from the optical member 20 so as to further have a third optical element of Variant 1 that changes the path of the light and a fourth optical element of Variant 1 that changes the path of the light in addition to the first optical element 21 and the second optical element 22. The third optical element of Variant 1 and the fourth optical element of Variant 1 may be implemented by, for example, a mirror, a prism, or other configurations. Here, as an example, similar to the first optical element 21 and the second optical element 22, the third optical element of Variant 1 and the fourth optical element of Variant 1 are configured by mirrors.

Figure 4:
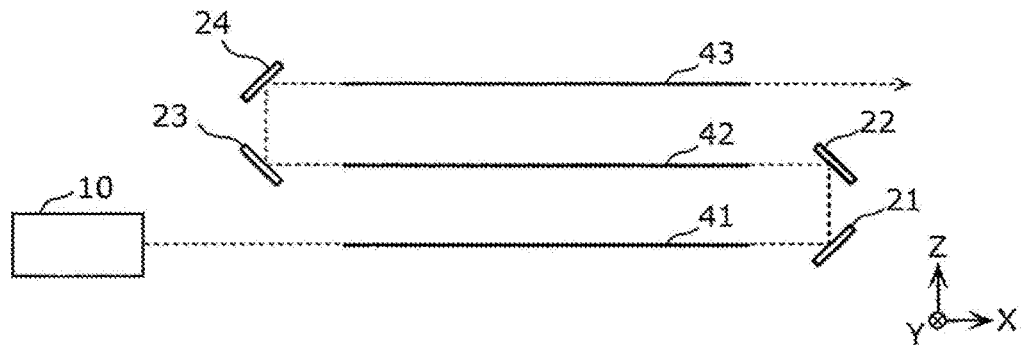
FIG. 4 is a schematic diagram showing a state in which an optical member of Variant 1 changes a path of light emitted from an optical sensor of Variant 1.

FIG. 4 is a schematic diagram showing a state in which the optical member of Variant 1 changes the path of the light emitted from the optical sensor 10.

As shown in FIG. 4, the optical member of Variant 1 includes a third optical element 23 and a fourth optical element 24 in addition to the first optical element 21 and the second optical element 22.

The third optical element 23 has a mirror surface that is tilted 45 degrees to the negative direction of the Z-axis from a plane defined by the X-axis direction and the Y-axis direction shown in FIG. 4.

The fourth optical element 24 has a mirror surface that is tilted 135 degrees to the negative direction of the Z-axis from the plane defined by the X-axis direction and the Y-axis direction shown in FIG. 4.

As shown in FIG. 4, the light whose path has been changed by the second optical element 21 is reflected by the third optical element 23, and travels in the positive direction of the Z-axis on the plane defined by the Z-axis direction and the Y-axis direction shown in FIG. 4. That is, the path of the light emitted from the optical sensor 10 and traveling in a planar shape is changed from the negative direction of the X-axis to the positive direction of the Z-axis by the third optical element 23. Then, the light whose path has been changed by the third optical element 23 is reflected by the fourth optical element 24, and travels in the positive direction of the X-axis on the plane defined by the X-axis direction and the Y-axis direction shown in FIG. 4. That is, the path of the light traveling in a planar shape whose path has been changed by the third optical element 23 is changed from the positive direction of the Z-axis to the positive direction of the X-axis by the fourth optical element 24.

According to the above configuration, in addition to the first sensing surface 41 and the second sensing surface 42, the optical sensor 10 and the optical member of Variant 1 further form a third sensing surface 43 consisting of a plane on which the light whose path has been changed one or more times (three times in this variant) by the optical member of Variant 1 travels. Therefore, the processing unit 40 can perform the input processing based further on a third sensing result of the optical sensor 10 on the sensing surface 43 in addition to the first sensing result of the optical sensor 10 on the first sensing surface 41 and the second sensing result of the optical sensor 10 on the second sensing surface 42. Thus, according to the input device of Variant 1, the non-contact input operation can be more precisely received.

Embodiment 2

Hereinafter, an input device of Embodiment 2 in which a part of the configuration is changed from the input device 1 of Embodiment 1 is described.

Figure 5:
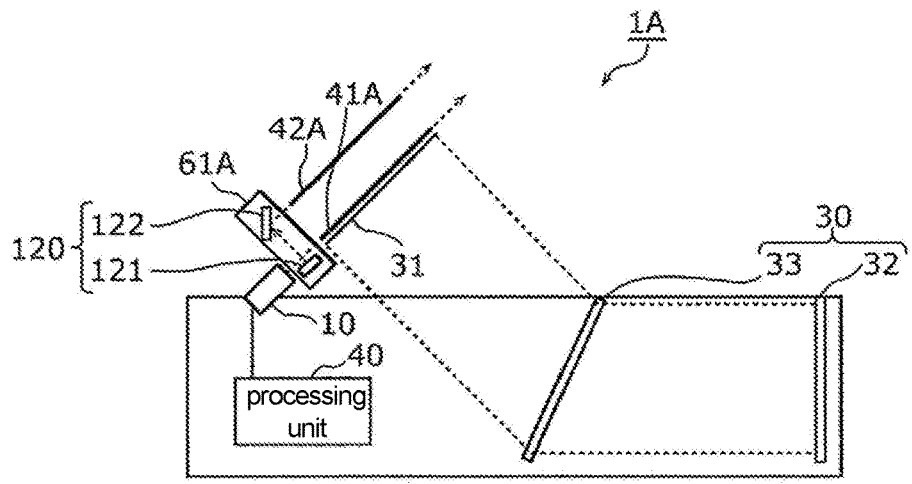
FIG. 5 is a block diagram showing a configuration of an input device of Embodiment 2.

FIG. 5 is a block diagram showing a configuration of an input device 1A of Embodiment 2. Hereinafter, the same components of the input device 1A as those of the input device 1 are denoted by the same reference numerals and a detailed description thereof is omitted and regarded as already described, and differences from the input device 1 are mainly described.

As shown in FIG. 5, the input device 1A is different from the input device 1 of Embodiment 1 in that the optical member 20 is changed to an optical member 120, the first support member 61 is changed to a first support member 61A, and the incidence suppression member 50 and the second support member 62 are removed.

The optical member 120 changes the path of the light emitted from the optical sensor 10. More specifically, the optical member 120 includes a rotatable first optical element 121 that changes the path of light and a second optical element 122 that changes the path of light. The first optical element 121 and the second optical element 122 may be implemented by, for example, a mirror, a prism, or other configurations. Here, as an example, the first optical element 121 and the second optical element 122 are configured by mirrors.

Figure 6A:
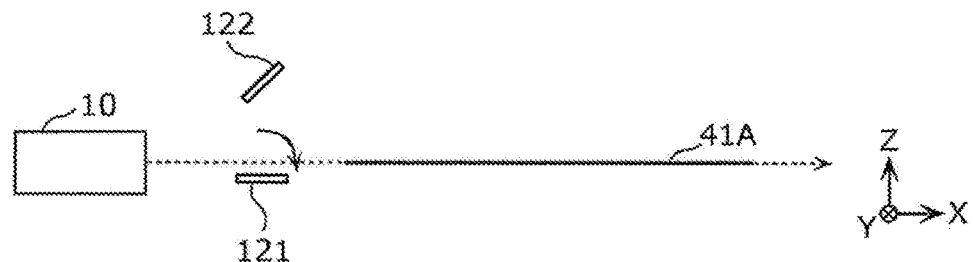
FIG. 6A is a schematic diagram showing a state in which an optical member of Embodiment 2 changes a path of light emitted from an optical sensor of Embodiment 2.
Figure 6B:
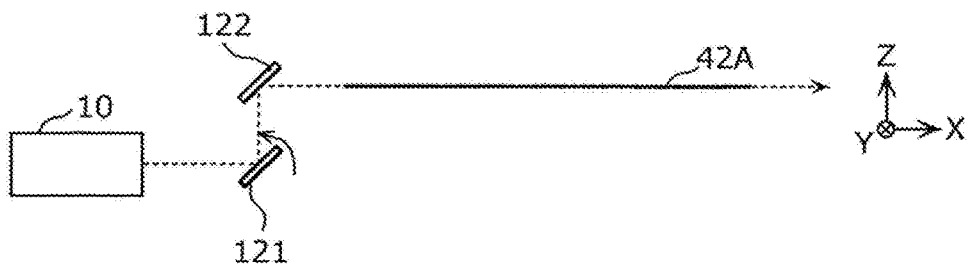
FIG. 6B is a schematic diagram showing a state in which the optical member of Embodiment 2 changes the path of the light emitted from the optical sensor of Embodiment 2.

FIGS. 6A and 6B are schematic diagrams showing a state in which the optical member 120 changes the path of the light emitted from the optical sensor 10.

As shown in FIGS. 6A and 6B, the first optical element 121 has a mirror surface, and can be rotated to a first angle at which the mirror surface is substantially parallel to a plane defined by the X-axis direction and the Y-axis direction shown in FIGS. 6A and 6B, and a second angle at which the mirror surface is substantially parallel to a plane tilted 45 degrees to the positive direction of the Z-axis from the plane defined by the X-axis direction and the Y-axis direction shown in FIGS. 6A and 6B.

As shown in FIGS. 6A and 6B, the second optical element 122 has a mirror surface that is tilted 135 degrees to the negative direction of the Z-axis from the plane defined by the X-axis direction and the Y-axis direction shown in FIGS. 6A and 6B.

As shown in FIG. 6A, when the first optical element 121 is at the first angle, the light emitted from the optical sensor 10 and traveling in a planar shape directly travels straight without being reflected by the first optical element 121. Therefore, the optical sensor 10 and the optical member 120 form a first sensing surface 41A consisting of a plane on which the light emitted from the optical sensor 10 whose path has not been changed by the optical member 120 travels.

As shown in FIG. 6B, when the first optical element 121 is at the second angle, the light emitted from the optical sensor 10 and traveling in a planar shape is reflected by the first optical element 121, and travels in the positive direction of the Z-axis on the plane defined by the Z-axis direction and the Y-axis direction shown in FIG. 6B. That is, the path of the light emitted from the optical sensor 10 and traveling in a planar shape is changed from the positive direction of the X-axis to the positive direction of the Z-axis by the first optical element 121.

Then, the light whose path has been changed by the first optical element 121 is reflected by the second optical element 122, and travels in the positive direction of the X-axis on the plane defined by the X-axis direction and the Y-axis direction shown in FIG. 6B. That is, the path of the light traveling in a planar shape whose path has been changed by the first optical element 121 is changed by the second optical element 122 from the positive direction of the Z-axis to the positive direction of the X-axis. Therefore, the optical sensor 10 and the optical member 120 form a second sensing surface 42A consisting of a plane on which the light emitted from the optical sensor 10 whose path has been changed one or more times by the optical member 20 travels.

In this way, the optical sensor 10 and the optical member 120 form the first sensing surface 41A and the second sensing surface 42A by a time-division of a first period in which the first optical element 121 is at the first angle and a second period in which the first optical element 121 is at the second angle.

The first support member 61A is a member that supports the optical member 120.

According to the input device 1A having the above configuration, similar to Embodiment 1, in addition to the position of the object to be sensed by the optical sensor 10 on the plane substantially parallel to the display surface 31, the position in a direction perpendicular to the display surface 31 can also be detected. Thus, according to the input device 1A, the non-contact input operation can be precisely received.

In addition, according to the input device 1A, the optical member 120 and the first support member 61A are disposed in front of the first sensing surface 41A when viewed from the optical sensor 10. Thereby, according to the input device 1A, it is possible to reduce the frequency at which the user comes into contact with the input device 1A when the user who uses the input device 1A performs an input operation.

(Variant 2)

Hereinafter, an input device of Variant 2 in which a part of the configuration is changed from the input device 1A of Embodiment 2 is described.

The input device of Variant 2 is configured from the input device 1A by changing the optical member 120 to an optical member of Variant 2. More specifically, the optical member of Variant 2 is configured from the optical member 120 by changing the first optical element 121 to a rotatable first optical element of Variant 2 that changes the path of light and further changing to have a third optical element of Variant 2 that changes the path of light. The first optical element of Variant 2 and the third optical element of Variant 2 may be implemented by, for example, a mirror, a prism, or other configurations. Here, as an example, similar to the second optical element 122, the first optical element of Variant 2 and the third optical element of Variant 2 are configured by mirrors.

Figure 7A:
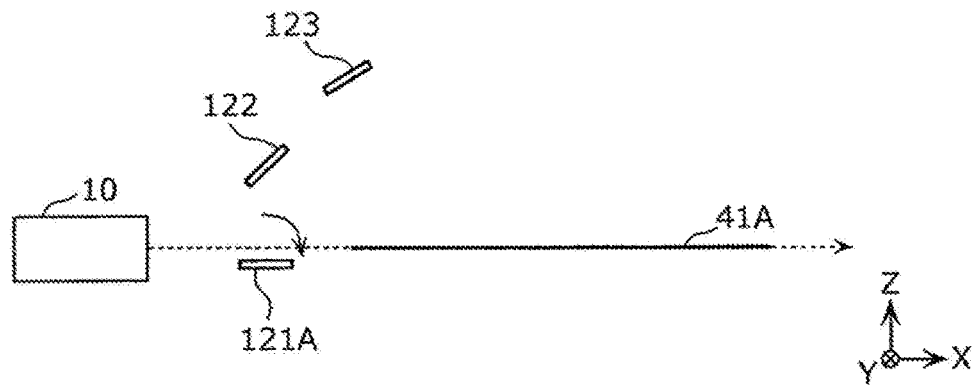
FIG. 7A is a schematic diagram showing a state in which an optical member of Variant 2 changes a path of light emitted from an optical sensor of Variant 2.
Figure 7B:
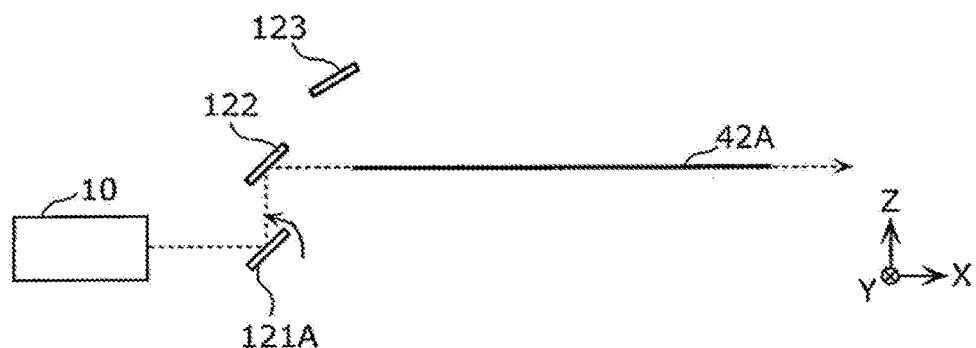
FIG. 7B is a schematic diagram showing a state in which the optical member of Variant 2 changes the path of the light emitted from the optical sensor of Variant 2.
Figure 7C:
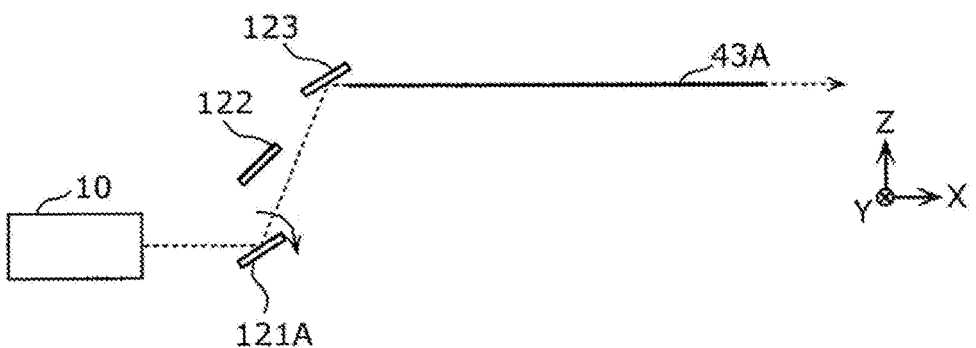
FIG. 7C is a schematic diagram showing a state in which the optical member of Variant 2 changes the path of the light emitted from the optical sensor of Variant 2.

FIGS. 7A to 7C are schematic diagrams showing a state in which the optical member of Variant 2 changes the path of the light emitted from the optical sensor 10.

As shown in FIGS. 7A to 7C, the optical member of Variant 2 includes a first optical element 121A and a third optical element 123 in addition to the second optical element 22.

The first optical element 121A has a mirror surface, and can be rotated to a first angle at which the mirror surface is substantially parallel to a plane defined by the X-axis direction and the Y-axis direction shown in FIGS. 7A to 7C, a second angle at which the mirror surface is substantially parallel to a plane that is tilted 45 degrees to the positive direction of the Z-axis from the plane defined by the X-axis direction and the Y-axis direction shown in FIGS. 7A to 7C, and a third angle at which the mirror surface is substantially parallel to a plane that is tilted 35 degrees to the positive direction of the Z-axis from the plane defined by the X-axis direction and the Y-axis direction shown in FIGS. 7A to 7C.

The third optical element 123 has a mirror surface that is tilted 145 degrees to the negative direction of the Z-axis from the plane defined by the X-axis direction and the Y-axis direction shown in FIGS. 7A to 7C.

As shown in FIG. 7A, when the first optical element 121A is at the first angle, similar to the input device 1A of Embodiment 2, the light emitted from the optical sensor 10 and traveling in a planar shape directly travels straight without being reflected by the first optical element 121A. Therefore, the optical sensor 10 and the optical member of Variant 2 form a first sensing surface 41A consisting of a plane on which the light emitted from the optical sensor 10 whose path has not been changed by the optical member of Variant 2 travels.

As shown in FIG. 7B, when the first optical element 121A is at the second angle, similar to the case of the input device 1A of Embodiment 2, the optical sensor 10 and the optical device of Variant 2 form a second sensing surface 42A consisting of a plane on which the light emitted from the optical sensor 10 whose path has been changed one or more times (twice in this variant) by the optical member of Variant 2 travels.

As shown in FIG. 7C, when the first optical element 121A is at the third angle, the light emitted from the optical sensor 10 and traveling in a planar shape is reflected by the first optical element 121A, and travels in a first direction on the positive side of the Z-axis on a first plane that is tilted 70 degrees to the positive direction of the Z-axis from the plane defined by the X-axis direction and the Y-axis direction shown in FIG. 7C. That is, the path of the light emitted from the optical sensor 10 and traveling in a planar shape is changed from the positive direction of the X-axis to the first direction on the first plane by the first optical element 121A.

Then, the light whose path has been changed by the first optical element 121A is reflected by the third optical element 123, and travels in the positive direction of the X-axis on the plane defined by the X-axis direction and the Y-axis direction shown in FIG. 7C. That is, the path of the light traveling in a planar shape whose path has been changed by the first optical element 121 is changed by the third optical element 123 from the first direction on the first plane to the positive direction of the X-axis. Therefore, the optical sensor 10 and the optical member of Variant 2 form a third sensing surface 43A consisting of a plane on which the light emitted from the optical sensor 10 whose path has been changed one or more times (twice in this variant) by the optical member of Variant 2 travels.

In this way, the optical sensor 10 and the optical member of Variant 2 form the first sensing surface 41A, the second sensing surface 42A, and the third sensing surface 43A by a time-division of a first period in which the first optical element 121A is at the first angle, a second period in which the first optical element 121A is at the second angle, and a third period in which the first optical element 121A is at the third angle. Therefore, the processing unit 40 can perform the input processing based further on a third sensing result of the optical sensor 10 on the third sensing surface 43A in addition to the first sensing result of the optical sensor 10 on the first sensing surface 41A and the second sensing result of the optical sensor 10 on the second sensing surface 42A. Thus, according to the input device of Variant 2, the non-contact input operation can be more precisely received.

(Variant 3)

Hereinafter, an input device of Variant 3 in which a part of the configuration is changed from the input device 1A of Embodiment 2 is described.

The input device of Variant 3 is configured from the input device 1A by changing the optical member 120 to an optical member of Variant 3. More specifically, the optical member of Variant 3 is configured from the optical member 120 by changing the first optical element 121 to a rotatable first optical element of Variant 3 that changes the path of light and changing the second optical element 122 to a second optical element of Variant 3 that changes the path of light. The first optical element of Variant 3 and the second optical element of Variant 3 may be implemented by, for example, a mirror, a prism, or other configurations. Here, as an example, the first optical element of Variant 3 and the second optical element of Variant 3 are configured by mirrors.

Figure 8A:
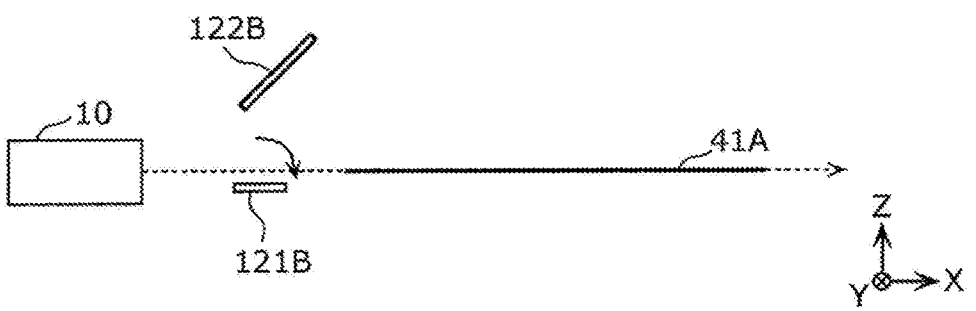
FIG. 8A is a schematic diagram showing a state in which an optical member of Variant 3 changes a path of light emitted from an optical sensor of Variant 3.
Figure 8B:
FIG. 8B is a schematic diagram showing a state in which the optical member of Variant 3 changes the path of the light emitted from the optical sensor of Variant 3.
Figure 8C:
FIG. 8C is a schematic diagram showing a state in which the optical member of Variant 3 changes the path of the light emitted from the optical sensor of Variant 3.

FIGS. 8A to 8C are schematic diagrams showing a state in which the optical member of Variant 3 changes the path of the light emitted from the optical sensor 10.

As shown in FIGS. 8A to 8C, the optical member of Variant 3 includes a first optical element 121B and a second optical element 122B.

The first optical element 121B has a mirror surface, and can be rotated to a first angle at which the mirror surface is substantially parallel to a plane defined by the X-axis direction and the Y-axis direction shown in FIGS. 8A to 8C, a second angle at which the mirror surface is substantially parallel to a plane that is tilted 45 degrees to the positive direction of the Z-axis from the plane defined by the X-axis direction and the Y-axis direction shown in FIGS. 8A to 8C, and a third angle at which the mirror surface is substantially parallel to a plane that is tilted 40 degrees to the positive direction of the Z-axis from the plane defined by the X-axis direction and the Y-axis direction shown in FIGS. 8A to 8C.

The second optical element 122B has the same configuration as that of the second optical element 122 of Embodiment 2 except that the mirror surface area of the second optical element 122B is increased. That is, the second optical element 122B is configured from the second optical element 122 of Embodiment 2 in a manner that the mirror surface area of the second optical element 122B is increased.

As shown in FIG. 8A, when the first optical element 121B is at the first angle, similar to the input device 1A of Embodiment 2, the light emitted from the optical sensor 10 and traveling in a planar shape directly travels straight without being reflected by the first optical element 121B. Therefore, the optical sensor 10 and the optical member of Variant 3 form a first sensing surface 41A consisting of a plane on which the light emitted from the optical sensor 10 whose path has not been changed by the optical member of Variant 3 travels.

As shown in FIG. 8B, when the first optical element 121B is at the second angle, similar to the case of the input device 1A of Embodiment 2, the optical sensor 10 and the optical device of Variant 3 form a second sensing surface 42A consisting of a plane on which the light emitted from the optical sensor 10 whose path has been changed one or more times by the optical member of Variant 3 travels.

As shown in FIG. 8C, when the first optical element 121B is at the third angle, the light emitted from the optical sensor 10 and traveling in a planar shape is reflected by the first optical element 121B, and travels in a first direction on the positive side of the Z-axis on a second plane that is tilted 80 degrees to the positive direction of the Z-axis from the plane defined by the X-axis direction and the Y-axis direction shown in FIG. 8C. That is, the path of the light emitted from the optical sensor 10 and traveling in a planar shape is changed from the positive direction of the X-axis to the first direction on the second plane by the first optical element 121B.

Then, the light whose path has been changed by the first optical element 121B is reflected by the second optical element 122B, and travels in the first direction on the positive side of the Z-axis on a third plane that is tilted 10 degrees to the positive direction of the Z-axis from the plane defined by the X-axis direction and the Y-axis direction shown in FIG. 8C. That is, the path of the light traveling in a planar shape whose path has been changed by the first optical element 121 is changed from the first direction on the second plane to the first direction on the third plane by the second optical element 122B. Therefore, the optical sensor 10 and the optical member of Variant 3 form a third sensing surface 43B consisting of a plane on which the light emitted from the optical sensor 10 whose path has been changed one or more times (twice in this variant) by the optical member of Variant 3 travels.

In this way, the optical sensor 10 and the optical member of Variant 3 form the first sensing surface 41A, the second sensing surface 42A, and the third sensing surface 43B by a time-division of a first period in which the first optical element 121B is at the first angle, a second period in which the first optical element 121B is at the second angle, and a third period in which the first optical element 121B is at the third angle. Therefore, the processing unit 40 can perform the input processing based further on a third sensing result of the optical sensor 10 on the third sensing surface 43B in addition to the first sensing result of the optical sensor 10 on the first sensing surface 41A and the second sensing result of the optical sensor 10 on the second sensing surface 42A. Thus, according to the input device of Variant 3, the non-contact input operation can be more precisely received.

(Variant 4)

Hereinafter, an input device of Variant 4 in which a part of the configuration is changed from the input device 1 of Embodiment 1 is described.

The input device of Variant 4 is configured from the input device 1 by changing the optical member 20 to an optical member of Variant 4. More specifically, the optical member of Variant 4 is configured from the optical member 20 by changing the second optical element 22 to a movable second optical element of Variant 4 that changes the path of light. The second optical element of Variant 4 may be implemented by, for example, a mirror, a prism, or other configurations. Here, as an example, the second optical element of Variant 4 is configured by a mirror.

Figure 9A:
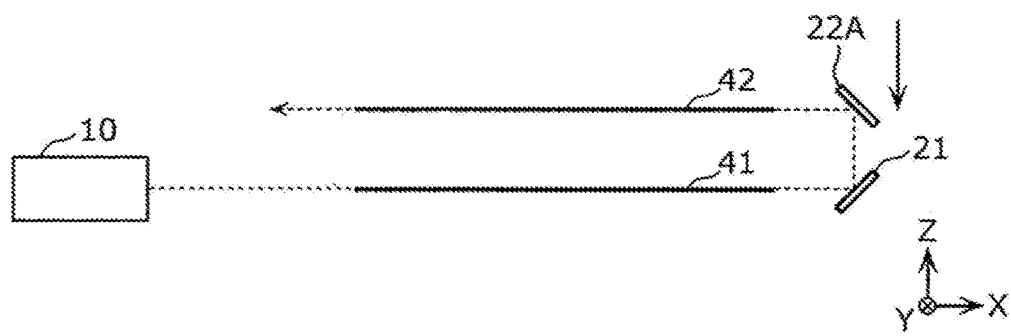
FIG. 9A is a schematic diagram showing a state in which an optical member of Variant 4 changes a path of light emitted from an optical sensor of Variant 4.
Figure 9B:
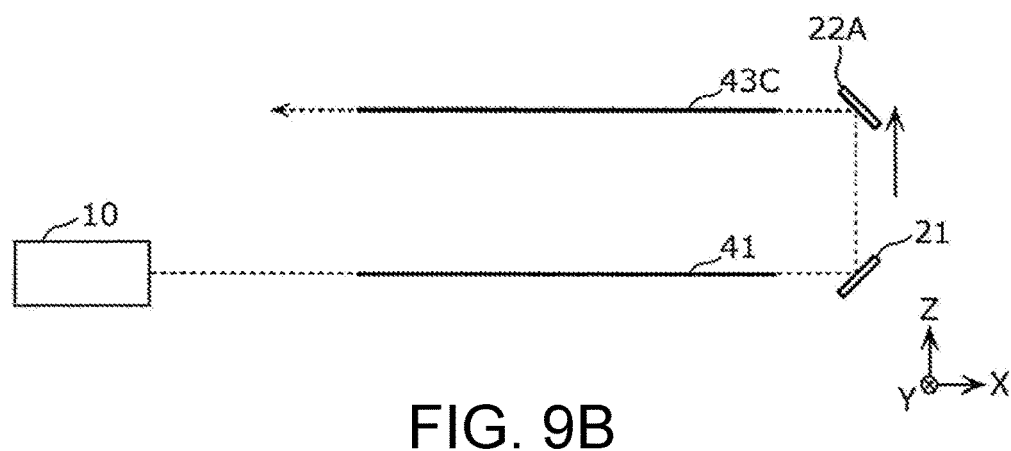
FIG. 9B is a schematic diagram showing a state in which the optical member of Variant 4 changes the path of the light emitted from the optical sensor of Variant 4.

FIGS. 9A and 9B are schematic diagrams showing a state in which the optical member of Variant 4 changes the path of the light emitted from the optical sensor 10.

As shown in FIGS. 9A and 9B, the optical member of Variant 4 includes a second optical element 22A in addition to the first optical element 21.

The second optical element 22A has a mirror surface that is tilted 135 degrees to the positive direction of the Z-axis from a plane defined by the X-axis direction and the Y-axis direction shown in FIGS. 9A and 9B, and can slide in the Z-axis direction between a first position (the position of the second optical element 22A in FIG. 9A) and a second position (the position of the second optical element 22A in FIG. 9B) on the same plane defined by the X-axis direction and the Y-axis direction.

As shown in FIG. 9A, when the second optical element 22A is at the first position, similar to the input device 1 of Embodiment 1, the optical sensor 10 and the optical member of Variant 4 form the first sensing surface 41 and the second sensing surface 42.

As shown in FIG. 9B, when the second optical element 22A is at the second position, the light emitted from the optical sensor 10 and traveling in a planar shape is reflected by the first optical element 21, and travels in the positive direction of the Z-axis on the plane defined by the Z-axis direction and the Y-axis direction shown in FIG. 9B. That is, the path of the light emitted from the optical sensor 10 and traveling in a planar shape is changed from the positive direction of the X-axis to the positive direction of the Z-axis by the first optical element 21. Then, the light whose path has been changed by the first optical element 21 is reflected by the second optical element 22A, and travels in the negative direction of the X-axis on the plane defined by the X-axis direction and the Y-axis direction shown in FIG. 9B. That is, the light traveling in a planar shape whose path has been changed by the first optical element 21 is changed from the positive direction of the Z-axis to the negative direction of the X-axis by the second optical element 22A. Therefore, the optical sensor 10 and the optical member of Variant 4 form a third sensing surface 43C consisting of a plane on which the light emitted from the optical sensor 10 whose path has been changed one or more times by the optical member of Variant 4 travels.

In this way, the optical sensor 10 and the optical member of Variant 4 constantly form the first sensing surface 41, and also form the second sensing surface 42 and the third sensing surface 43C by a time-division of a first period in which the second optical element 22A is at the first position and a second period in which the second optical element 22A is at the second position. Therefore, the processing unit 40 can perform the input processing based further on a third sensing result of the optical sensor 10 on the third sensing surface 43C in addition to the first sensing result of the optical sensor 10 on the first sensing surface 41 and the second sensing result of the optical sensor 10 on the second sensing surface 42. Thus, according to the input device of Variant 4, the non-contact input operation can be more precisely received.

(Variant 5)

Hereinafter, an input device of Variant 5 in which a part of the configuration is changed from the input device 1 of Embodiment 1 is described.

The input device of Variant 5 is configured from the input device 1 by changing the optical member 20 to an optical member of Variant 5. More specifically, the optical member of Variant 5 is configured from the optical member 20 by removing the second optical element 22 and changing the first optical element 21 to a rotatable first optical element of Variant 5 that changes the path of light. The first optical element of Variant 5 may be implemented by, for example, a mirror, a prism, or other configurations. Here, as an example, the first optical element of Variant 5 is configured by a mirror.

Figure 10A:
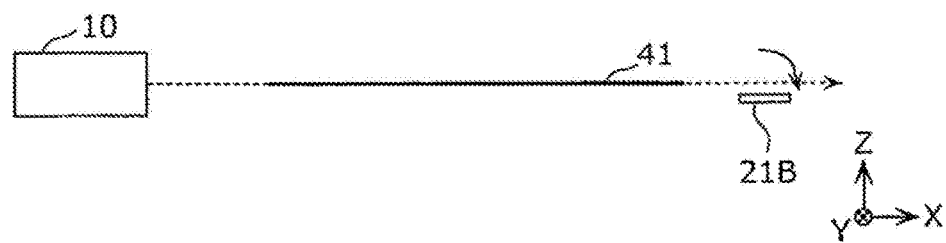
FIG. 10A is a schematic diagram showing a state in which an optical member of Variant 5 changes a path of light emitted from an optical sensor of Variant 5.
Figure 10B:
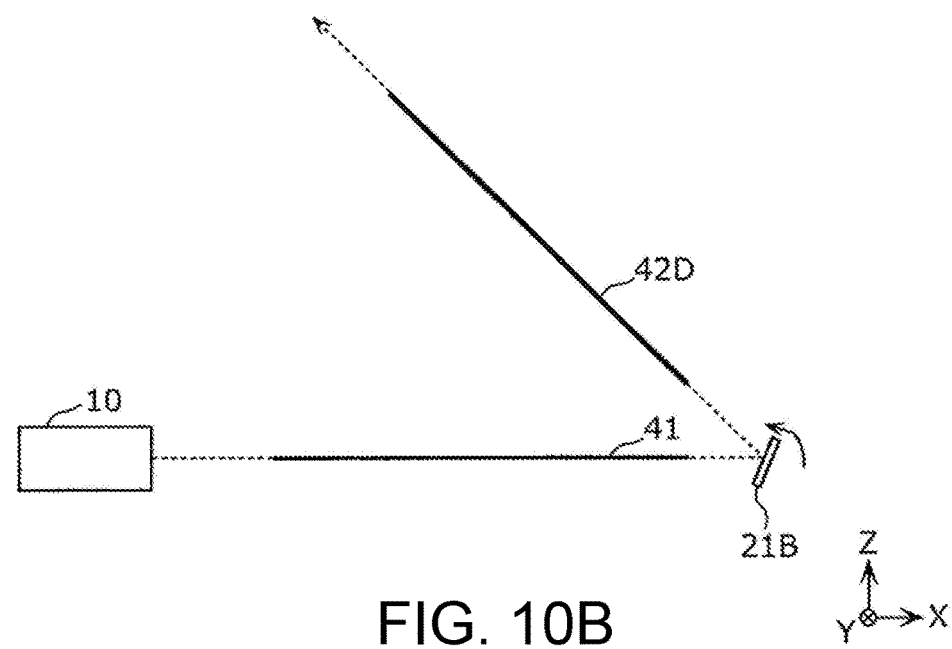
FIG. 10B is a schematic diagram showing a state in which the optical member of Variant 5 changes the path of the light emitted from the optical sensor of Variant 5.
Figure 10C:
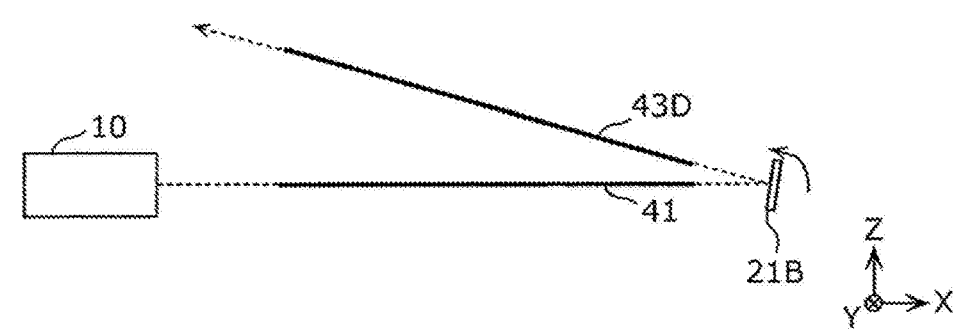
FIG. 10C is a schematic diagram showing a state in which the optical member of Variant 5 changes the path of the light emitted from the optical sensor of Variant 5.

FIGS. 10A to 10C are schematic diagrams showing a state in which the optical member of Variant 5 changes the path of the light emitted from the optical sensor 10.

As shown in FIGS. 10A to 10C, the optical member of Variant 5 includes a first optical element 21B.

The first optical element 21B has a mirror surface, and can be rotated to a first angle at which the mirror surface is substantially parallel to a plane defined by the X-axis direction and the Y-axis direction shown in FIGS. 10A to 10C, a second angle at which the mirror surface is substantially parallel to a plane that is tilted 70 degrees to the positive direction of the Z-axis from a plane defined by the X-axis direction and the Y-axis direction shown in FIGS. 10A to 10C, and a third angle at which the mirror surface is substantially parallel to a plane that is tilted 80 degrees to the positive direction of the Z-axis from the plane defined by the X-axis direction and the Y-axis direction shown in FIGS. 10A to 10C.

As shown in FIG. 10A, when the first optical element 21B is at the first angle, the light emitted from the optical sensor 10 directly travels straight without being reflected by the first optical element 21B. Therefore, the optical sensor 10 and the optical member of Variant 5 form a first sensing surface 41 consisting of a plane on which the light emitted from the optical sensor 10 whose path has not been changed by the optical member of Variant 5 travels.

As shown in FIG. 10B, when the first optical element 21B is at the second angle, the light emitted from the optical sensor 10 is reflected by the first optical element 21B, and travels in the first direction on the positive direction side of the Z-axis on a fourth plane that is tilted 140 degrees to the positive direction of the Z-axis from the plane defined by the X-axis direction and the Y-axis direction shown in FIG. 10B. That is, the path of the light emitted from the optical sensor 10 and traveling in a planar shape is changed from the positive direction of the X-axis to the first direction on the fourth plane by the first optical element 21B. Therefore, the optical sensor 10 and the optical member of Variant 5 form a second sensing surface 42D consisting of a plane on which the light emitted from the optical sensor 10 whose path has been changed one or more times (once in this variant) by the optical member of Variant 5 travels.

As shown in FIG. 10C, when the first optical element 21B is at the third angle, the light emitted from the optical sensor 10 is reflected by the first optical element 21B, and travels in the first direction on the positive direction side of the Z-axis on a fifth plane that is tilted 160 degrees to the positive direction of the Z-axis from the plane defined by the X-axis direction and the Y-axis direction shown in FIG. 10C. That is, the path of the light emitted from the optical sensor 10 and traveling in a planar shape is changed from the positive direction of the X-axis to the first direction on the fifth plane by the first optical element 21B. Therefore, the optical sensor 10 and the optical member of Variant 5 form a third sensing surface 43D consisting of a plane on which the light emitted from the optical sensor 10 whose path has been changed one or more times (once in this variant) by the optical member of Variant 5 travels.

In this way, the optical sensor 10 and the optical member of Variant 5 constantly form the first sensing surface 41, and also form the second sensing surface 42D and the third sensing surface 43D by a time-division of a first period in which the first optical element 21B is at the first position and a second period in which the first optical element 21B is at the second position. Therefore, the processing unit 40 can perform the input processing based further on a third sensing result of the optical sensor 10 on the third sensing surface 43D in addition to the first sensing result of the optical sensor 10 on the first sensing surface 41 and the second sensing result of the optical sensor 10 on the second sensing surface 42D. Thus, according to the input device of Variant 5, the non-contact input operation can be more precisely received.

(Variant 6)

Hereinafter, an input device of Variant 6 in which a part of the configuration is changed from the input device 1A of Embodiment 2 is described.

The input device of Variant 6 is configured from the input device 1A by changing the optical member 120 to an optical member of Variant 6. More specifically, the optical member of Variant 6 is configured from the optical member 120 by removing the second optical element 122 and changing the first optical element 121 to a rotatable first optical element of Variant 6 that changes the path of light. The first optical element of Variant 6 may be implemented by, for example, a mirror, a prism, or other configurations. Here, as an example, the first optical element of Variant 6 is configured by a mirror.

Figure 11A:
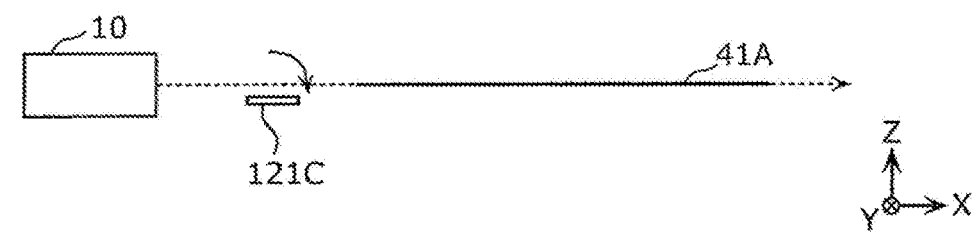
FIG. 11A is a schematic diagram showing a state in which an optical member of Variant 6 changes a path of light emitted from an optical sensor of Variant 6.
Figure 11B:
FIG. 11B is a schematic diagram showing a state in which the optical member of Variant 6 changes the path of the light emitted from the optical sensor of Variant 6.
Figure 11C:
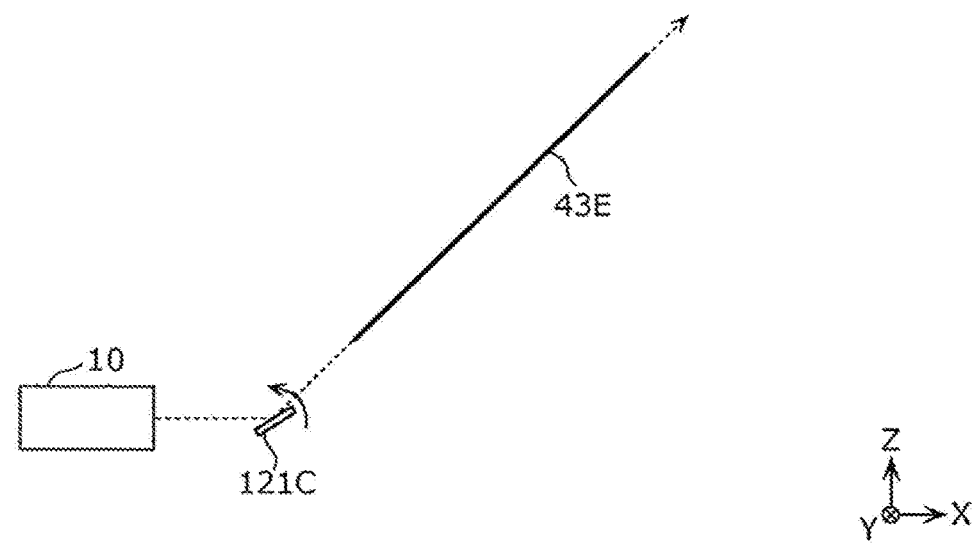
FIG. 11C is a schematic diagram showing a state in which the optical member of Variant 6 changes the path of the light emitted from the optical sensor of Variant 6

FIGS. 11A to 11C are schematic diagrams showing a state in which the optical member of Variant 6 changes the path of the light emitted from the optical sensor 10.

As shown in FIGS. 11A to 11C, the optical member of Variant 6 includes a first optical element 121C.

The first optical element 121C has a mirror surface, and can be rotated to a first angle at which the mirror surface is substantially parallel to a plane defined by the X-axis direction and the Y-axis direction shown in FIGS. 11A to 11C, a second angle at which the mirror surface is substantially parallel to a plane that is tilted 10 degrees to the positive direction of the Z-axis from the plane defined by the X-axis direction and the Y-axis direction shown in FIGS. 11A to 11C, and a third angle at which the mirror surface is substantially parallel to a plane that is tilted 20 degrees to the positive direction of the Z-axis from the plane defined by the X-axis direction and the Y-axis direction shown in FIGS. 11A to 11C.

As shown in FIG. 11A, when the first optical element 121C is at the first angle, similar to the input device 1A of Embodiment 2, the light emitted from the optical sensor 10 and traveling in a planar shape directly travels straight without being reflected by the first optical element 121C. Therefore, the optical sensor 10 and the optical member of Variant 6 form a first sensing surface 41A consisting of a plane on which the light emitted from the optical sensor 10 whose path has not been changed by the optical member of Variant 6 travels.

As shown in FIG. 11B, when the first optical element 121C is at the second angle, the light emitted from the optical sensor 10 and traveling in a planar shape is reflected by the first optical element 121C, and travels in the first direction on the positive side of the Z-axis on a sixth plane that is tilted 20 degrees to the positive direction of the Z-axis from the plane defined by the X-axis direction and the Y-axis direction shown in FIG. 11B. That is, the path of the light emitted from the optical sensor 10 and traveling in a planar shape is changed from the positive direction of the X-axis to the first direction on the sixth plane by the first optical element 121C. Therefore, the optical sensor 10 and the optical member of Variant 6 form a second sensing surface 42E consisting of a plane on which the light emitted from the optical sensor 10 whose path has been changed one or more times (once in this variant) by the optical member of Variant 6 travels.

As shown in FIG. 11C, when the first optical element 121C is at the third angle, the light emitted from the optical sensor 10 and traveling in a planar shape is reflected by the first optical element 121C, and travels in the first direction on the positive side of the Z-axis on a seventh plane that is tilted 40 degrees to the positive direction of the Z-axis from the plane defined by the X-axis direction and the Y-axis direction shown in FIG. 11C. That is, the path of the light emitted from the optical sensor 10 and traveling in a planar shape is changed from the positive direction of the X-axis to the first direction on the seventh plane by the first optical element 121C. Therefore, the optical sensor 10 and the optical member of Variant 6 form a third sensing surface 43E consisting of a plane on which the light emitted from the optical sensor 10 whose path has been changed one or more times (once in this variant) by the optical member of Variant 6 travels.

In this way, the optical sensor 10 and the optical member of Variant 6 constantly form the first sensing surface 41A, and also form the second sensing surface 42E and the third sensing surface 43E by a time-division of a first period in which the first optical element 121C is at the first position and a second period in which the first optical element 121C is at the second position. Therefore, the processing unit 40 can perform the input processing based further on a third sensing result of the optical sensor 10 on the third sensing surface 43E in addition to the first sensing result of the optical sensor 10 on the first sensing surface 41A and the second sensing result of the optical sensor 10 on the second sensing surface 42E. Thus, according to the input device of Variant 6, the non-contact input operation can be more precisely received.

(Variant 7)

Hereinafter, an input device of Variant 7 in which a part of the configuration is changed from the input device 1 of Embodiment 1 is described.

The input device of Embodiment 1 has a configuration in which the first optical element 21 has a mirror surface that is tilted 45 degrees to the positive direction of the Z-axis from the plane defined by the X-axis direction and the Y-axis direction shown in FIG. 2, and the second optical element 22 has a mirror surface that is tilted 135 degrees to the positive direction of the Z-axis from the plane defined by the X-axis direction and the Y-axis direction shown in FIG. 2. On the other hand, the input device of Variant 7 has a configuration in which a first optical element of Variant 7 has a mirror surface that is tilted 45 degrees to the positive direction of the Z-axis from the plane defined by the X-axis direction and the Y-axis direction shown in FIG. 2 and further rotated counterclockwise by an angle α about the Z-axis, and a second optical element of Variant 7 has a mirror surface that is tilted 135 degrees to the positive direction of the Z-axis from the plane defined by the X-axis direction and the Y-axis direction shown in FIG. 2 and further rotated counterclockwise by the angle α about the Z-axis.

Figure 12:
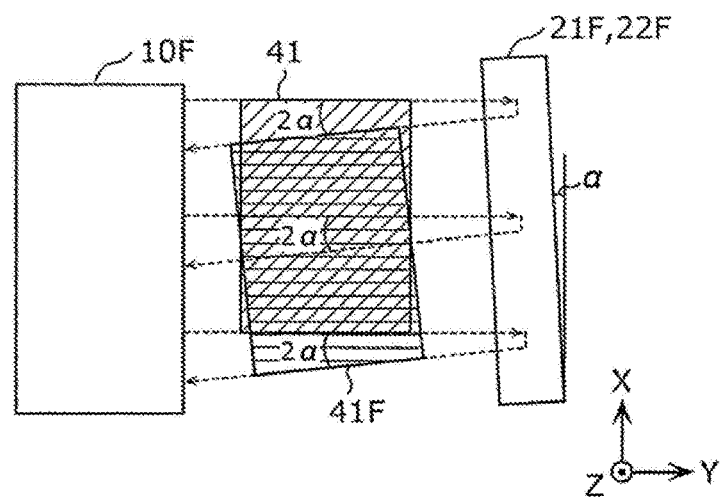
FIG. 12 is a schematic diagram showing a state in which an optical member of Variant 7 changes a path of light emitted from an optical sensor of Variant 7.

FIG. 12 is a schematic diagram showing a state in which the optical member of Variant 7 changes the path of the light emitted from the optical sensor 10.

As shown in FIG. 12, the optical member of Variant 7 includes a first optical element 21F and a second optical element 22F.

As shown in FIG. 12, similar to Embodiment 1, the optical sensor 10 emits the light traveling in a planar shape in the positive direction of the X-axis on a plane defined by the X-axis direction and the Y-axis direction shown in FIG. 12. Therefore, similar to the input device 1 of Embodiment 1, the optical sensor 10 and the optical member of Variant 7 form the first sensing surface 41.

The light emitted from the optical sensor 10 and traveling in a planar shape is reflected by the first optical element 21F and the second optical element 22F, and travels in a direction tilted by an angle $2a$ counterclockwise from the X-axis direction on the plane defined by the X-axis direction and the Y-axis direction shown in FIG. 2. Therefore, the optical sensor 10 and the optical member of Variant 7 form a second sensing surface 42F from the light traveling in the direction tilted by the angle $2a$ counterclockwise from the X-axis direction on the plane defined by the X-axis direction and the Y-axis direction shown in FIG. 2.

According to the input device of Variant 7 having the above configuration, a second object that cannot be sensed by the optical sensor 10 on the first sensing surface 41 due to occlusion of the first object can be sensed by the optical sensor 10 on the second sensing surface 42F.

Embodiment 3

Hereinafter, an input device of Embodiment 3 in which a part of the configuration is changed from the input device 1 of Embodiment 1 is described.

Figure 13:
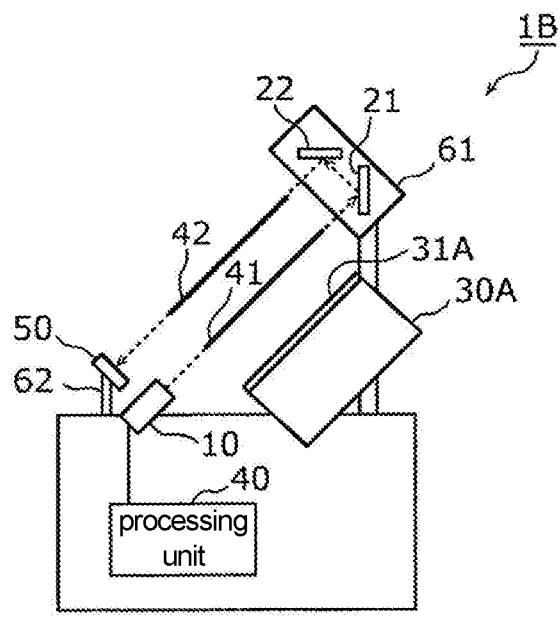
FIG. 13 is a block diagram showing a configuration of an input device of Embodiment 3.

FIG. 13 is a block diagram showing a configuration of an input device 1B of Embodiment 3.

Hereinafter, the same components of the input device 1B as those of the input device 1 are denoted by the same reference numerals and a detailed description thereof is omitted as already described, and differences from the input device 1 are mainly described.

As shown in FIG. 13, the input device 1B is different from the input device 1 of Embodiment 1 in that the display unit 30 is changed to a display unit 30A.

The display unit 30A displays an image on a display surface 31A without aerial imaging. The display unit 30A may be implemented by, for example, a liquid crystal display using a liquid crystal surface thereof as the display surface 31A, a projector that projects an image on a screen serving as the display surface 31A, or other configurations.

The display unit 30A is disposed in a manner that the display surface 31A is closer to the main body side of the input device 1B than the first sensing surface 41 and the second sensing surface 42. Thereby, a user who uses the input device 1B can perform an input operation without touching the display unit 30A.

The display surface 31A is substantially parallel to at least one of the first sensing surface 41 and the second sensing surface 42. Here, since the first sensing surface 41 and the second sensing surface 42 are substantially parallel to each other, the display surface 31A is substantially parallel to the first sensing surface 41 and the second sensing surface 42.

According to the input device 1B having the above configuration, similar to Embodiment 1, in addition to the position of the object to be sensed by the optical sensor 10 on the plane substantially parallel to the display surface 31A, the position in a direction perpendicular to the display surface 31A can also be detected. Thus, according to the input device 1B, the non-contact input operation can be precisely received.

In addition, according to the input device 1B, the image is displayed on the display surface 31A without aerial imaging. Accordingly, the input device 1B can be implemented by a relatively simple configuration.

(Supplementation)

The input device of the disclosure is described above based on Embodiments 1 to 3 and Variants 1 to 7, but the disclosure is limited to these embodiments and variants. Configurations obtained by applying various modification conceived by those skilled in the art to the above embodiments or variants in a range not departing from the gist of the disclosure, or forms configured by combining the components in different embodiments or variants may be included in the scope of the aspect of the disclosure.

INDUSTRIAL APPLICABILITY

The disclosure can be widely used in devices capable of performing a non-contact input operation.

What is claimed is:

1. An input device, comprising:
   an optical sensor which emits light traveling in a planar shape and senses an object on the plane where the emitted light travels,
   an optical member which changes a path of the light emitted from the optical sensor, and
   a processing unit which performs input processing based on sensing results of the optical sensor;
   wherein the optical sensor and the optical member form a first sensing surface consisting of a planar region in which the light emitted from the optical sensor travels and a second sensing surface that is farther from the optical sensor than the first sensing surface, and the processing unit performs the input processing based on a first sensing result of the optical sensor on the first sensing surface and a second sensing result of the optical sensor on the second sensing surface, and the optical member comprises a movable optical element capable of changing the path of the light emitted from the optical sensor, the first sensing surface is formed when the position of the optical element is a first position, and the second sensing surface is formed when the position of the optical element is a second position.

2. The input device according to claim 1,
wherein the light traveling on the second sensing surface is the light traveling on the first sensing surface whose path has been changed by the optical member.

3. The input device according to claim 1,
wherein the optical member comprises a rotatable optical element capable of changing the path of the light emitted from the optical sensor, the first sensing surface is formed when the rotation angle of the optical element is a first angle, and the second sensing surface is formed when the rotation angle of the optical element is a second angle.

4. The input device according to claim 1,
wherein the first sensing surface and the second sensing surface are substantially parallel.

5. The input device according to claim 2,
wherein the first sensing surface and the second sensing surface are substantially parallel.

6. The input device according to claim 3,
wherein the first sensing surface and the second sensing surface are substantially parallel.

7. The input device according to claim 1,
wherein the optical member comprises a mirror.

8. The input device according to claim 2,
wherein the optical member comprises a mirror.

9. The input device according to claim 3,
wherein the optical member comprises a mirror.

10. The input device according to claim 4,
wherein the optical member comprises a mirror.

11. The input device according to claim 1, further comprising
a display unit which displays an image on a display surface.

12. The input device according to claim 11,
wherein the display surface is substantially parallel to at least one of the first sensing surface and the second sensing surface.

13. The input device according to claim 11,
wherein the display unit displays the image on the display surface by aerial imaging, and
the display surface is formed on the first sensing surface or the second sensing surface.

14. The input device according to claim 12,
wherein the display unit displays the image on the display surface by aerial imaging, and
the display surface is formed on the first sensing surface or the second sensing surface.

15. The input device according to claim 1, further comprising
an incidence suppression member which suppresses the light emitted from the optical sensor from being incident on the optical sensor without contacting the object to be sensed.

16. The input device according to claim 11,
wherein an icon is included in the image that has been displayed on the display surface by the display unit, and
the processing unit detects, based on the first sensing result and the second sensing result, a click movement of clicking the icon from a user who uses the input device and performs the input processing based on the detection.

* * * * *